Feb. 2, 1954

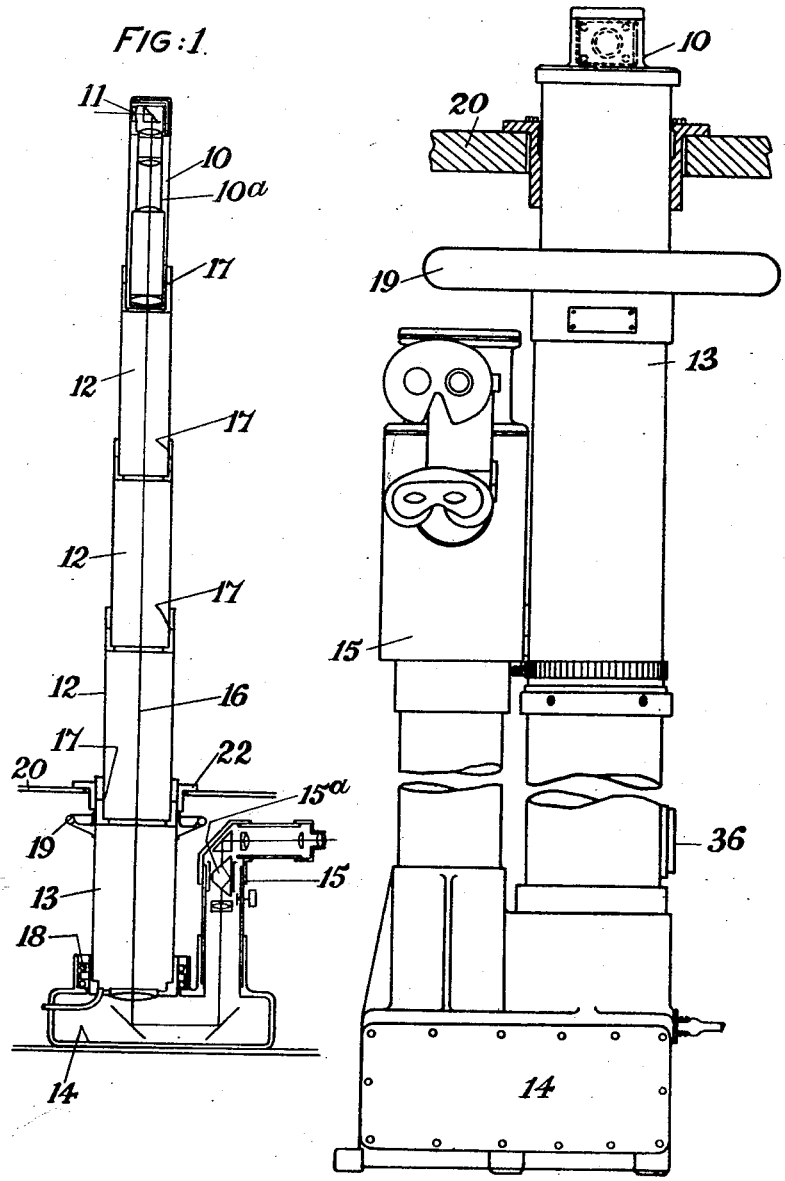

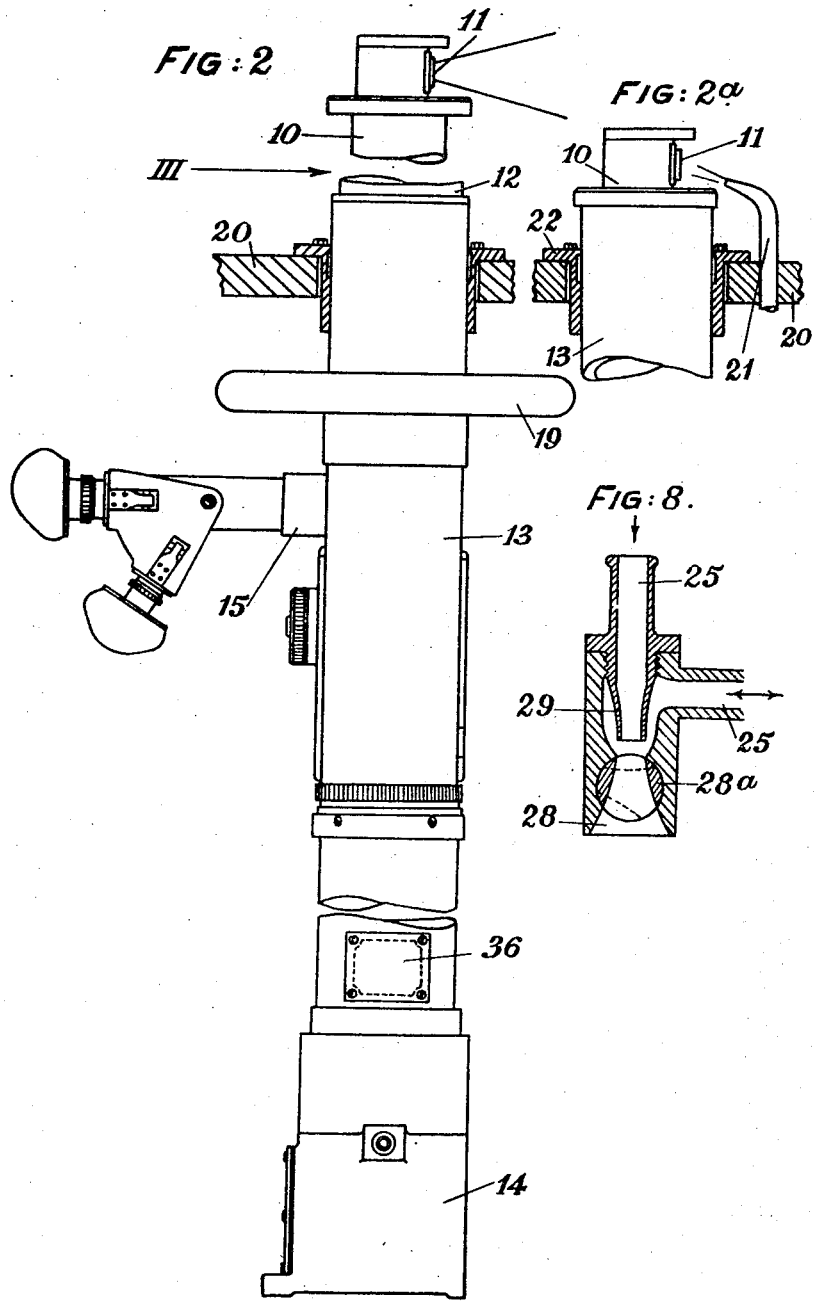

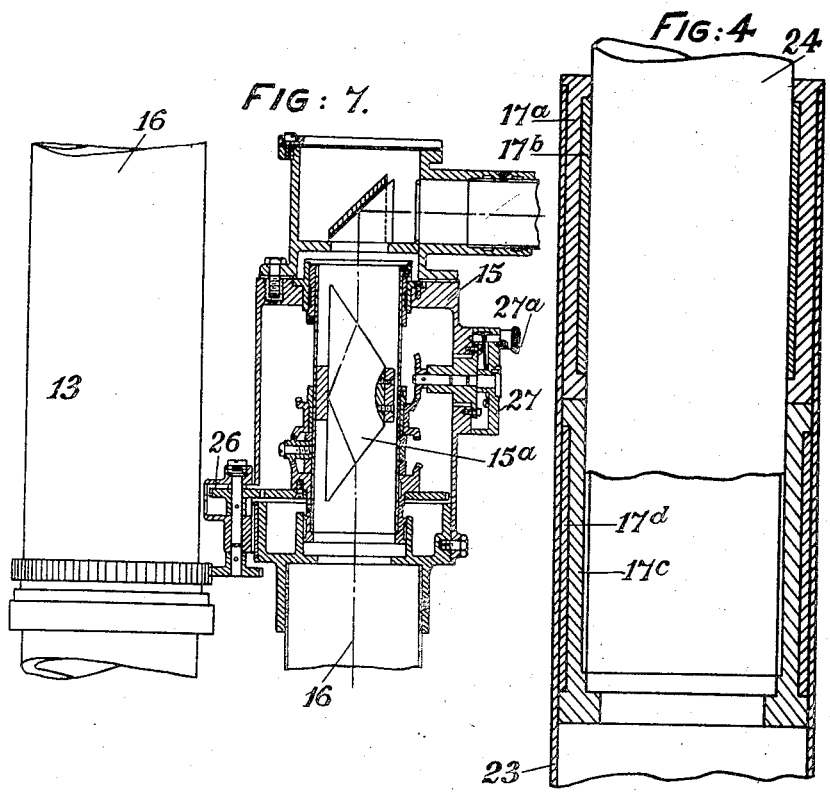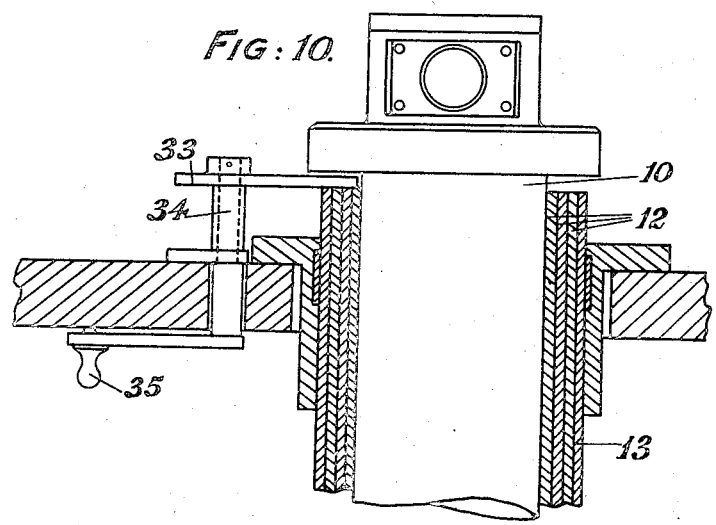

C. D. MacGILL 2,667,813

EXTENSIBLE OPTICAL SIGHTING OR OBSERVATION INSTRUMENT

Filed Dec. 22, 1948

Inventor
Charles D. MacGill
By
Young, Emery & Thompson
Attorneys

Feb. 2, 1954

C. D. MacGILL
EXTENSIBLE OPTICAL SIGHTING
OR OBSERVATION INSTRUMENT 2,667,813

Filed Dec. 22, 1948

Inventor
Charles D. MacGill
By Young, Emery & Thompson
Attys.

Patented Feb. 2, 1954

2,667,813

UNITED STATES PATENT OFFICE 2,667,813

EXTENSIBLE OPTICAL SIGHTING OR OBSERVATION INSTRUMENT

Charles D. MacGill, Glasgow, Scotland, assignor to Barr & Stroud Limited, Glasgow, Scotland Application December 22, 1948, Serial No. 66,612

4 Claims. (Cl. 88—72)

This invention relates to an extendable optical sighting or observation (hereinafter referred to simply as sighting) instrument for use where direct vision is not possible or desirable and in which a sighting window or the like is extendable relative to the base or other part of the instrument whereat the observer is located, generally in order to clear obstructions in the line of sight and generally without alteration in focus or field of view. The invention is particularly applicable to periscopes for use on land or on water which have to be accommodated in confined positions.

It has hitherto been proposed that such extendable sighting instruments should be extended by power applied externally of the instrument, but in such cases factors may arise which may cause mechanical complications which are inconvenient and undesirable.

In accordance with the present invention we provide an extendable optical sighting instrument having mechanically telescoping parts adapted to be extended by compressed air or other gas (hereinafter referred to simply as air) introduced internally thereto.

Preferably the compressed air which is filtered and desiccated if necessary, is introduced between two lenses the light between which is in the form of a parallel beam in the optical system of the instrument.

The arrangement may be such that leakage of air out from the telescoping parts except through the telescoping joints is eliminated or minimized, whereby leaking air is concentrated through the joints and acts to prevent infiltration of moisture thereat.

The internal compressed air may also be led to a nozzle fitted externally at the window of the instrument in order to remove moisture on the exposed surface thereof.

As a result of the invention an extendable instrument is provided which can be quickly and easily extended or retracted without affecting the optical characteristics of the instrument such as focus or angular field of view, moisture is positively excluded from the telescoping joints, and control of the extension and retraction is easily effectable.

I will now describe the invention, simply by way of example, with reference to the drawings accompanying the provisional specification, in which—

Figure 1 is a diagrammatic vertical section through an extended telescopic periscope suitable for use on land or above water, for example in amphibious tanks.

Figure 2 is an elevation of the periscope in the extended position.

Figure 2a is a detail view corresponding to Figure 2 showing the telescopic part retracted.

Figure 3 is an elevation at right angles in the direction of the arrow III, Figure 2.

Figures 4, 5 and 6 are detail vertical sectional views showing respectively a telescopic joint, the air passage at the top section of the periscope, and the air inlet passage at the base of the periscope.

Figure 7 is a vertical sectional view showing the erecting prism arrangement,

Figure 8 is a sectional view of the injector valve arrangement for controlling extension and retraction.

Figure 10 is a detail vertical section showing the manner in which the extension of the telescoping parts may be regulated in stages.

Figure 5:
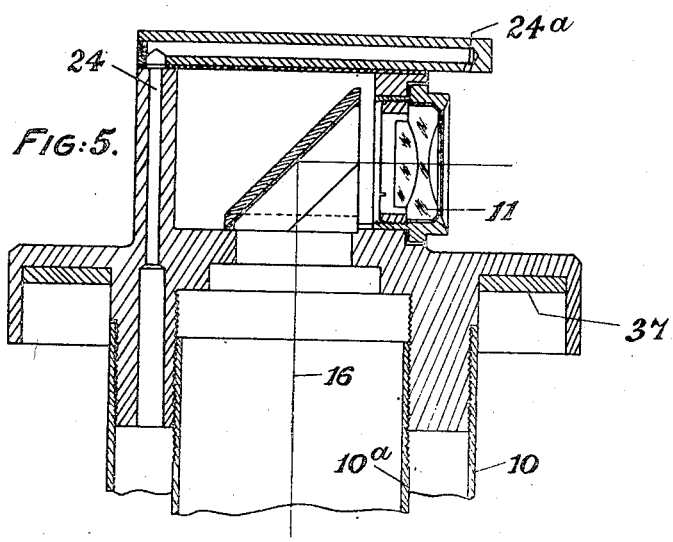

Referring to the drawings, the periscope comprises a top section 10 with a viewing window 11, three intermediate telescoping sections 12, a base section 13, a prism box 14, and an eyepiece assembly 15 which extends generally parallel to the base section 13.

The top section 10 is provided with the usual optical elements as shown diagrammatically, these optical elements being housed in an inner container 10a which is hermetically sealed but leaves an annular space between it and the outer tube or section 10.

The prism box 14 and eyepiece assembly 15 are secured together as a hermetically sealed optical unit and are provided with an erecting prism arrangement as shown at 15a. The passage of light through the instrument is indicated by the line 16.

The telescoping sections bear on each other by means of sealing glands 17 as shown in Figure 4 in greater detail, while the telescoping parts 10 and 12 are adapted to rotate as a unit with 13 about a vertical axis by means of bearings 18 controlled by a training hand wheel 19. The whole periscope projects upwards through a deck or like surface 20 through a gland 22 therein.

In Figures 2 to 3 the parts corresponding to those in Figure 1 are indicated by the same reference numerals. It will be noted in Figure 2a that in the retracted position of the telescoping parts a nozzle 21 points to the instrument window 11 and is adapted to eject window washing solvent thereonto.

In Figure 4 it will be seen that the telescoping joints indicated at 17 in Figure 1, comprise a gland 17a with a soft packing 17b fixed to the outer telescoping part 23, and a similar gland 17c with soft packing 17d on the inner telescoping part 24. This arrangement minimizes air leakage from the interior outwards through the gland, but any such leakage being outwards, entry of moisture is prevented. The rest of the telescoping parts are sealed as hermetically as possible. Coil springs may be provided between the glands 17a and 17c (Figure 4) at the joints 17, in which event the energy stored in these joints at extension assists in retraction.

As shown in Figure 5, the top section 10 together with the inner container 10a furnish an annular passage for the compressed air in the interior of the telescoping parts, and such compressed air can pass upwards through a passage 24 to a nozzle 24a adapted to direct a stream of compressed air on to the outer surface of the window 11 in order to keep same visually clear.

Figure 6:
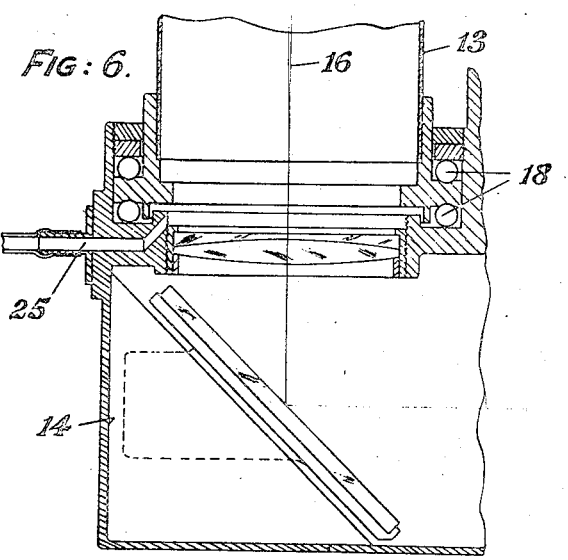

As shown in Figure 6, a compressed air inlet passage 25 allows entry of compressed air to the interior of the telescoping parts for the purpose of extending the periscope, and if desired exhaustion of air from the interior may also take place through said passage. During extension the compressed air in the interior acts upon the lower closed end of the container 10a in order to cause extension.

As shown in Figure 7, the rotatable part of the periscope (13) is interconnected through two-to-one gearing 26 with the erecting prism 15a of the eyepiece assembly so that with all round training of the periscope 13 the erecting prism maintains an erect image in the field of view. Furthermore, a differential operating hand wheel 27 with a locking pin 27a is provided so that in the event of the line of sight of the periscope 13 getting out of phase with the original setting of the erecting prism 15a, differential movement of the erecting prism about its axis may be effected so as to correct any tilt of image errors which may be present after extending or retracting the periscope.

In Figure 8 the compressed air inlet passage 25 leading to the interior of the telescoping parts is provided with a branch outlet 28 having an adjustable valve 28a which may be opened fully or partially closed, or may be fully closed as indicated in dotted lines. An ejector nozzle 29 faces in the direction of the outlet 28.

When the valve 28a is closed, the full pressure of the compressed air is available to extend the periscope to any desired height at which it may be positively locked or gripped. When the valve is partially open it can be adjusted to retain the desired extended height without the use of a positive lock or clamp. Further opening of the valve then controls the speed at which the periscope is retracted, and when the valve is fully opened the exhaust air is ejected and creates a partial vacuum in the interior.

Figure 9:
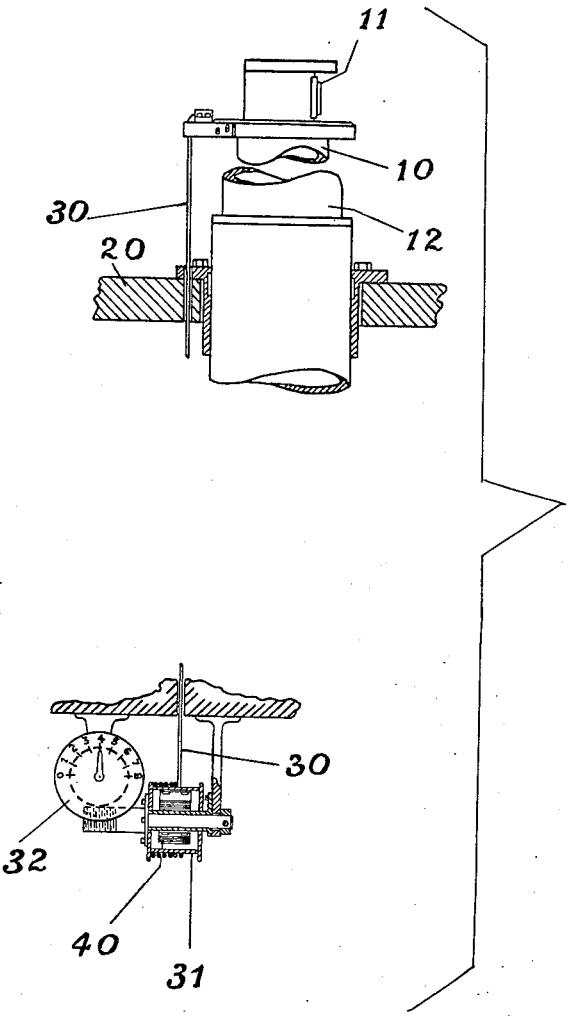
Figure 9 is a side elevation partly in section showing a spring drum and indicator connected to the top section of a periscope similar to that shown in Figs. 1 and 2.

As shown in Figure 9, a flexible wire 30 may be connected to the top section of the periscope so that as the periscope extends the wire 30 is unwound from the drum 31. This drum is geared to an indicator 32 which shows the amount of extension. During unwinding a spring 40 inside the drum is wound up and the energy thus stored can be used to influence the retraction of the periscope.

In Figure 10 the periscope is shown in the retracted position, and a disc 33 is mounted eccentrically on axis 34 and can be angularly adjusted thereabout by handle 35 whereby the extremity of the disc can be set to act as a stop positively to limit the extension at stages corresponding to the combined length of any number of telescopic sections. In the minimum position only the top section 10 will be extended and the total length of the periscope will then comprise the base section 13 and the top section 10.

In the retracted position the disc 33 positively retains the sections 12 in the retracted position.

It will be evident that the invention allows for say a periscope to be built up of several sections, the length of each section being dependent on the accommodation available and the position of the retracted line of sight in relation to the structure, while the number of sections is dependent on the maximum distance between the line of sight and the structure when the periscope is fully extended.

Various modifications may be provided, for example the eyepiece assembly may be a continuation of the bottom section and may consist of a box containing the eyepiece optical system. As shown in the drawings, however, if the periscope has to be accommodated in a space that is restricted in height, it is preferable to double up the optical path and to continue the eyepiece tube upwards from the prism box, which may be fixed to the floor, so as to bring the eyepiece to a convenient height for the observer.

Moreover, if it is not convenient for the observer to move around with the periscope in training, the eyepiece may be fixed as described above, the erecting prism retaining an erect image.

Access may be provided at 36 through the base section 13 of the telescoping parts to enable cleaning of the lens surfaces exposed to the internal compressed air.

As shown in Figure 5, a buffer 37 may be provided to prevent metallic knock on the ends of the telescoping sections during retraction.

I claim:

1. An optical sighting instrument comprising an inner, an outer, and at least one intermediate tube mounted together for telescoping movement, gland means providing a substantially gas-tight seal between each pair of telescoping tubes, first and second optical light transmitting means of the instrument optical system adapted to transmit light one to the other in the form of a parallel beam and mounted within the inner and the outer tube respectively each to form a gas-tight seal with the surrounding tube wall, conduit means providing inter-communication between the interior of the outer tube and the exterior thereof in the region between said first and second optical means to allow introduction into and withdrawal from said region of compressed gas to vary the distance between said first and second optical means, and hence the optical length of the instrument, without alteration in focus of the instrument optical system, and adjustable extension control means adapted selectively to leave free the inner tube and any selected number of the other telescoping intermediate tubes, but to lock stationary the remainder of the tubes, whereby on supply of compressed gas through said conduit means to said region, the instrument extends positively to the selected length.

2. An optical sighting instrument as claimed in claim 1, in which said conduit means comprises a main conduit providing a direct flow of compressed gas externally of the outer tube, a branch conduit providing intercommunication between the main conduit and the interior of the outer tube, valve means in the main conduit at the exhaust side of the branch conduit adapted to control in the main conduit thereat the cross-sectional area permitting direct flow of the compressed gas and hence both the extension and the speed of diminution of the instrument length.

3. An optical sighting instrument as claimed in claim 2 in which the main conduit wall in the region housing the valve means is shaped to provide an air ejector to enhance the suction effect through the branch conduit when the valve means is open.

4. An optical sighting instrument as claimed in claim 1 comprising a drum mounted for rotation about its axis, a spring associated with the drum and adapted to be wound to store potential energy on rotation of the drum in one direction, means transmitting motion of the inner tube to the drum to rotate same in the latter direction when the instrument is extended by the compressed gas, whereby the spring is wound and maintained in energy-storing condition by the gas pressure within the instrument and positively unwinds to retract the instrument when said pressure falls.

CHAS. D. MacGILL.

References Cited in the file of this patent

UNITED STATES PATENTS

| Number | Name | Date |
|---|---|---|
| 53,115 | Clark | Mar. 13, 1866 |
| 650,355 | Hesse | May 22, 1900 |
| 759,622 | Lake | May 10, 1904 |
| 767,624 | Bedell et al. | Aug. 16, 1904 |
| 815,657 | Swasey | Mar. 20, 1906 |
| 825,241 | Pino | July 3, 1906 |
| 832,219 | Spear | Oct. 2, 1906 |
| 867,982 | Lake | Oct. 15, 1907 |
| 1,175,609 | Cottrell | Mar. 14, 1916 |
| 1,222,156 | Steinmetz | Apr. 10, 1917 |
| 1,294,365 | Bedell | Feb. 11, 1919 |
| 1,313,534 | Hoffman | Aug. 19, 1919 |
| 1,539,846 | Jansson | June 2, 1925 |
| 1,624,733 | Humbrecht | Apr. 12, 1927 |
| 2,022,642 | Hueber et al. | Nov. 26, 1935 |
| 2,173,192 | Williams | Sept. 19, 1939 |
| 2,503,748 | Kollmorgan | Apr. 11, 1950 |
| 2,516,743 | Allin | July 25, 1950 |
| 2,538,683 | Guiler et al. | Jan. 16, 1951 |

FOREIGN PATENTS

| Number | Country | Date |
|---|---|---|
| 726,535 | France | May 30, 1932 |
| 502,561 | Great Britain | Mar. 30, 1939 |
| 646,029 | Great Britain | Nov. 15, 1950 |